United States Patent [19]

Garside

[11] Patent Number: 5,311,187
[45] Date of Patent: May 10, 1994

[54] SEARCH RADAR SYSTEM

[75] Inventor: Peter F. Garside, Blaricum, Netherlands

[73] Assignee: Hollandse Signaalapparaten B.V., Hengelo, Netherlands

[21] Appl. No.: 693,767

[22] Filed: Apr. 26, 1991

Related U.S. Application Data

[63] Continuation of Ser. No. 289,651, Dec. 22, 1988, abandoned.

Foreign Application Priority Data

Dec. 23, 1987 [NL] Netherlands ................. 8703113

[51] Int. Cl.$^5$ .............................................. G01S 13/72
[52] U.S. Cl. ................................. 342/59; 342/96; 342/158
[58] Field of Search ............. 342/59, 57, 158, 52, 342/53, 54, 90, 96

[56] References Cited

U.S. PATENT DOCUMENTS

| | | | |
|---|---|---|---|
| 2,419,239 | 4/1947 | White | 342/158 |
| 2,514,617 | 7/1950 | Albersheim | 342/59 |
| 2,524,296 | 10/1950 | Mesner | 342/59 |
| 2,550,700 | 5/1951 | Lancor, Jr. et al. | 342/52 |
| 2,634,412 | 4/1953 | Meagher | 342/59 |
| 2,737,853 | 3/1956 | Gravenhorst et al. | 342/59 X |
| 2,776,421 | 1/1957 | Nessmith, Jr. | 342/59 |
| 2,997,706 | 8/1961 | Easy et al. | 342/158 |
| 2,998,598 | 8/1961 | Braun et al. | 342/59 |
| 3,010,102 | 11/1961 | Ketchledge et al. | 342/53 |
| 3,160,881 | 12/1964 | Pederzani et al. | 342/176 |
| 3,193,824 | 7/1965 | Eitzenberger et al. | 342/33 |
| 3,235,867 | 7/1966 | Wirth | 342/195 |
| 3,328,797 | 6/1967 | Jorna et al. | 342/59 |
| 3,422,431 | 1/1969 | Hafner | 342/27 |
| 3,430,242 | 2/1969 | Safran | 342/371 |
| 3,599,207 | 8/1971 | Foiani et al. | 342/52 |
| 3,603,994 | 9/1971 | Williams et al. | 342/96 |
| 3,699,573 | 10/1972 | Andrews et al. | 342/96 |
| 3,710,382 | 1/1973 | Allen | 342/175 |
| 3,997,897 | 12/1976 | Brunner et al. | 342/43 |
| 4,045,799 | 8/1977 | Dapiran | 342/419 |
| 4,050,068 | 9/1977 | Berg et al. | 342/53 |
| 4,062,012 | 12/1977 | Colbert et al. | 342/90 |
| 4,122,521 | 10/1978 | Rick et al. | 342/52 X |
| 4,128,837 | 12/1978 | Page | 342/67 |
| 4,158,840 | 6/1979 | Schwab | 342/52 |
| 4,224,618 | 9/1980 | Rich et al. | 342/182 |
| 4,232,313 | 11/1980 | Fleishman | 342/36 |
| 4,319,242 | 3/1982 | Lewis | 342/67 |
| 4,333,077 | 6/1982 | Teihet | 342/52 |
| 4,347,513 | 8/1982 | Schindler | 342/13 |
| 4,375,697 | 3/1983 | Visher | 342/356 X |
| 4,403,220 | 9/1983 | Donovan | 342/29 |
| 4,780,719 | 10/1988 | Frei et al. | 342/53 |

*Primary Examiner*—John B. Sotomayor
*Attorney, Agent, or Firm*—Robert J. Kraus

[57] ABSTRACT

A search radar system, is provided which includes at least one search radar device (1) having a primary antenna (2) and at least one secondary radar device (3) having an SSR/IFF antenna (4). The radar devices (1, 3) independently supply plot data from which signals are derived that are each suitable for presentation on a radar display. The antennas (2, 4) are oriented in opposite directions so that the said signals are derived from individual plot data representing successive detections by the respective antennas of the same target which can be individually presented. Hence, the data rate of the radar system is doubled relative to a conventional radar system having a conventional secondary radar device and a conventional antenna system.

8 Claims, 2 Drawing Sheets

SEARCH RADAR SYSTEM

This is a continuation of application Ser. No. 289,651, filed on Dec. 22, 1988, now abandoned.

BACKGROUND OF THE INVENTION

The present invention relates to a search radar system provided with at least one search radar device having a primary antenna and at least one secondary radar device having an SSR/IFF antenna, which radar devices independently of each other provide plot messages from which signals are derived that are suitable for presentation on a radar display.

In such search radar systems, provided with one search radar device having a primary antenna and one secondary radar device having an SSF/IFF antenna, it is common that the SSR/IFF antenna is fitted on top of the primary antenna and is aligned in azimuth with and synchronously rotatable with the primary antenna. The secondary radar device only serves as a support for the search radar: it supplements the information obtained by the search radar apparatus with, for example, an identity code of a target. The plot data obtained by the two radar devices are combined and presented as one picture on the radar display.

If such a search radar system is used for Air Traffic Control purposes, and particularly for the guidance of air traffic approaching the airport, it is favourable to maintain a relatively high antenna rotation rate, thus achieving a high refreshment rate of the received data on a radar display. On the other hand, it is also favourable to keep the antenna rotation rate relatively low because in that way the demands on the antenna drive mechanism of the search radar system are lower, and the number of hits per scan can become higher, resulting in a better MTI performance.

SUMMARY OF THE INVENTION

The present invention has for its object to provide a search radar system, as described in the opening paragraphs, providing on the one hand a relatively low antenna rotation speed and on the other hand a sufficiently high refreshment rate of the received information to make the search radar system particularly suitable for control of air traffic approaching airports.

According to the invention, a search radar system of the type set forth in the opening paragraphs is provided and is characterised in that the orientation of one antenna differs in azimuth from the orientation of the other antenna and that the said signals are derived from individual plot data and can be presented individually.

A special embodiment comprises only one search radar device having a primary antenna and only one secondary radar device having an SSR/IFF antenna; according to the invention this secondary radar device is not only used to support the search radar device, but independently thereof provides plot messages that, because the two antennas are mounted back-to-back facing in opposite directions, increase the frequency with which a target can be indicated on a radar display by a factor of two, resulting in a high refreshment rate of the data while the antenna rotation rate can be maintained at a relatively low level. This effect becomes even more apparent when e.g. two search radar devices are present, each fitted with a primary antenna, and two secondary radar devices, each fitted with an SSR/IFF antenna, where both primary antennas and both SSR/IFF antennas are pointed in opposite directions, while the primary antennas on the one hand and the SSR/IFF antennas on the other hand are mounted in such a way that they are oriented perpendicular to each other in azimuth. The frequency at which target information is presented on a display is thus four times as high as the rotation frequency of the antenna combination.

The invention is in no way limited to the embodiments as described with reference to these figures; it should be regarded merely as an illustration of the invention.

DESCRIPTION OF THE PREFERRED EMBODIMENTS

Figure 1:
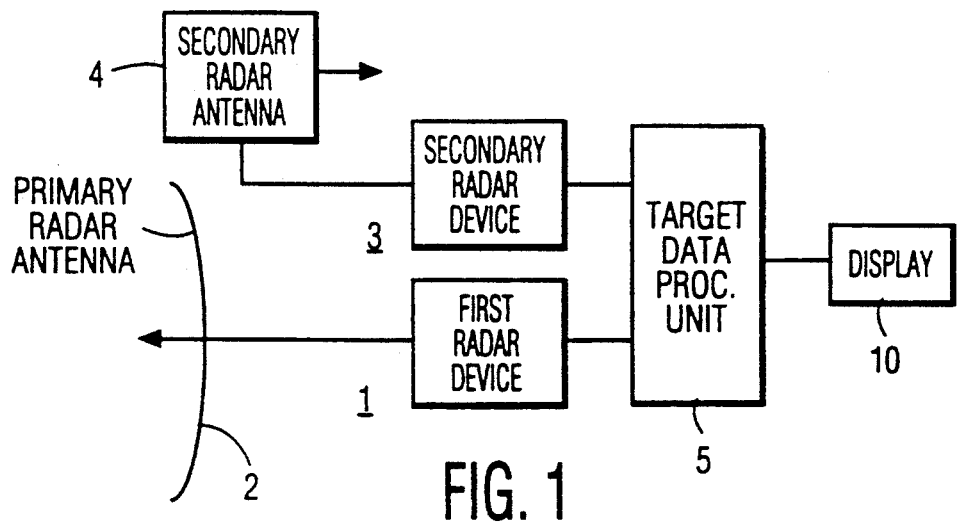
FIG. 1 shows the search radar with a primary antenna.

FIG. 1 shows a search radar apparatus 1 provided with a primary antenna 2. This search radar apparatus is in the customary way provided with a transmitter and receiver, a detector and a video processor (not shown), and supplies plot data consisting of information on the target position and, if possible, additional data, such as target width, target strength, etc. The figure also shows a secondary radar device 3 having an SSR/IFF antenna 4. The SSR/IFF antenna can either be an SSR antenna, or an IFF antenna used for the same purpose but in the military sector. The secondary radar device is in a customary way provided with a transmitter, receiver and video extractor, and supplies plot data comprising data on target position as well as an identity code and, if applicable, a target height code and possibly additional data such as target width, target strength, quality indication of the received code, etc.

SSR/IFF antenna 4 has been mounted in a customary way on top of primary antenna 2. However, in accordance with the invention, it is oriented in a direction opposite to that of primary antenna 2. FIG. 1 is a schematic illustration of the antenna configuration seen in profile.

The target plot data of both radar devices are supplied to a target track data processing unit 5. This data processing unit comprises means to:

correct the target plot data from secondary radar device 3 for the angle difference of 180° in orientation of SSR/IFF antenna 4 with respect to that of primary antenna 2 in order to prevent echoes from the same target from being assigned azimuth angle values differing in turn by 180° whereby they would be presented erroneously as such on a radar display 10 connected thereto;

predict from the plot data of the search radar apparatus the target position for subsequent revolutions of the primary antenna, upon which each time the target positions obtained during subsequent revolutions of this antenna by the search radar apparatus are compared with the predicted target positions and if these target positions are the same, observing certain tolerance limits, signals are produced that can be individually presented on the radar display;

predict from the plot data of the secondary radar device the target positions for subsequent revolutions of the SSR/IFF antenna, upon which each time the target positions obtained during subsequent revolutions of this antenna by the secondary radar device are compared with the predicted target positions and, if these target positions are the same, observing certain tolerance limits, signals are produced that can be individually presented on a radar display;

predict from the plot data of the search radar apparatus the target positions for the moments at which the SSR/IFF antenna will spot the target during subsequent revolutions, upon which each time the target positions predicted by the search radar apparatus during subsequent revolutions of the primary antenna for the moments at which the SSR/IFF antenna will spot the target during subsequent antenna revolutions, are compared with the target positions obtained by the secondary radar device during subsequent antenna revolutions and, if the target positions are the same, observing certain tolerance limits, it may be determined that the plot data obtained by the two radar devices originate from the same target. In that case, for instance, the plots from the search radar apparatus presented on a radar display may be provided with information originating from the secondary radar device, such as identity and height codes.

The procedure described above will result in a refreshment rate of the plots of a single target on a radar display which is twice as high as the rotation rate. The advantages thus obtained, as described in the introduction to this description, will be even greater if two search radar devices are used, each provided with a primary antenna, and two secondary radar devices, each provided with an SSR/IFF antenna. Both the two primary antennas and the two SSR/IFF antennas are then mounted back-to-back facing opposite directions while the primary antennas on the one hand and the SSR/IFF antennas on the other hand are mounted in such a way that they are oriented perpendicular to each other in azimuth. In principle, the target track data processing unit will be capable of plot processing according to the method described above. For this purpose, again the plot messages of a search radar apparatus are used as reference for the then 90°, 180° and 270° azimuth angle difference correction of the plot messages from the other radar devices and for correlation of the plots from the individual radar devices. It goes without saying that multiple correlation of plots from the four radar devices will provide a more reliable answer to the question whether the individual plots originate from one and the same target.

Figure 2:
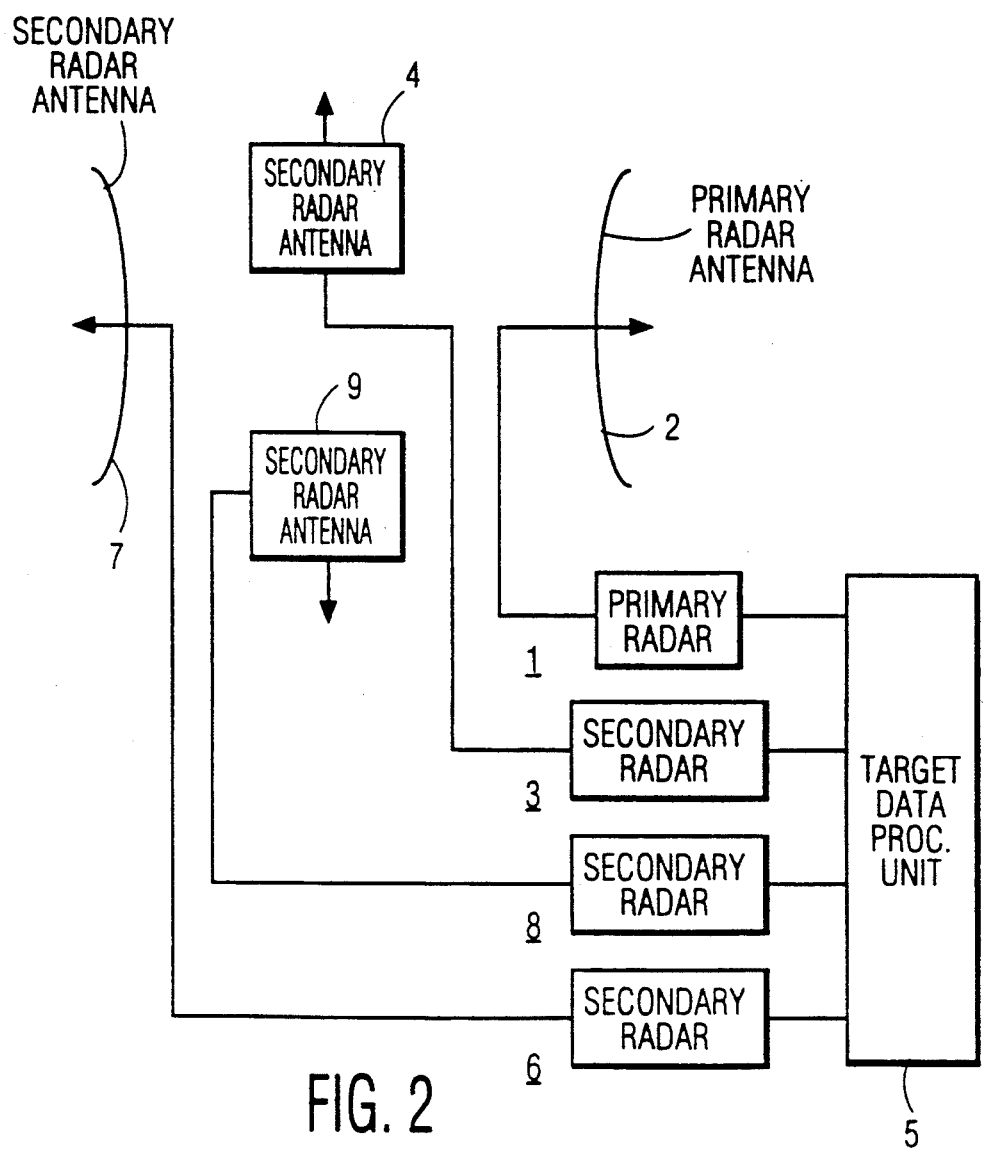
FIG. 2 shows the search radar with a primary and secondary antenna.

A possible embodiment is indicated in FIG. 2. Besides search radar apparatus 1 with primary antenna 2, secondary radar device 3 with secondary radar antenna 4 and a target data processing unit 5, a second search radar apparatus 6 with a second primary antenna 7 and a second secondary radar device 8 with a second radar antenna 9 is present. FIG. 2 is a schematic illustration of the antenna configuration seen from above. Target data processing unit 5 comprises means to:

correct the plot messages from secondary radar device 3, secondary radar device 6 and secondary radar device 8 respectively, for the angle difference of 90°, 180° and 270° in orientation of SSR/IFF antenna 4, second primary antenna 7 and second secondary antenna 9, respectively, with respect to that of primary antenna 2, in order to prevent that echoes from the same target are assigned azimuth angle value differing in turn by 90°, 180° and 270° respectively, and that they would be presented as such on a radar display to be connected;

predict from the plot messages of search radar apparatus 1 the target position for subsequent revolutions of primary antenna 2, upon which each time the target positions obtained during subsequent revolutions of this antenna by search radar apparatus 1 are compared with the predicted target positions and if these target positions are the same, observing certain tolerance limits, signals are produced that can be individually presented on a radar display;

predict from the plot messages of secondary radar device 3 the target positions for subsequent revolutions of SSR/IFF antenna 4, upon which each time the target positions obtained during subsequent revolutions of this antenna by secondary radar device 3 are compared with the predicted target positions and, if these target positions are the same, observing certain tolerance limits, signals are produced that can be individually presented on a radar display;

predict from the plot messages of the second search radar apparatus 6 the target position for subsequent revolutions of the primary antenna 7, upon which each time the target positions obtained during subsequent revolutions of this antenna by the second search radar apparatus 6 are compared with the predicted target positions and if these target positions are the same, observing certain tolerance limits, signals are produced that can be individually presented on a radar display;

predict from the plot messages of the second secondary radar device 8 the target positions for subsequent revolutions of SSR/IFF antenna 9, upon which each time the target positions obtained during subsequent revolutions of this antenna by the second secondary radar device 8 are compared with the predicted target positions and, if these target positions are the same, observing certain tolerance limits, signals are produced that can be individually presented on a radar display;

predict from the plot messages of search radar apparatus 1 the target positions for the moments at which SSR/IFF antenna 4, second primary antenna 7 and second secondary antenna 9 respectively, will spot the target during subsequent revolutions, upon which each time the target positions predicted by the search radar apparatus during subsequent revolutions of the primary antenna for the moments at which the other antennas will spot the target during subsequent antenna revolutions, are compared with the target positions obtained by the other radar devices, during subsequent antenna revolutions and, if the target positions are the same, observing certain tolerance limits, it may be determined that the plot messages obtained by the two radar devices originate from the same target.

Figure 3:
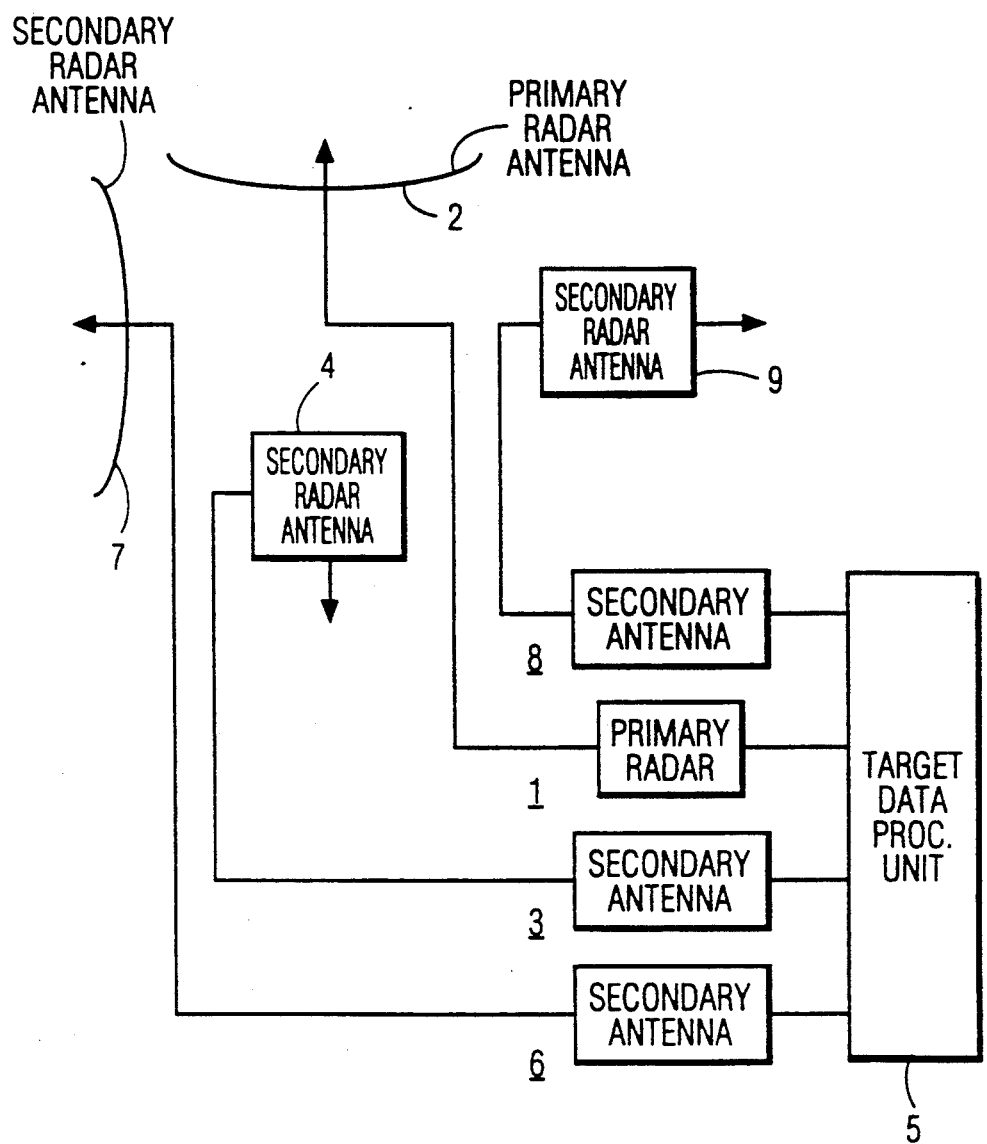
FIG. 3 shows an alternative embodiment of search radar in FIG. 2.

Another embodiment is illustrated in FIG. 3. Here the antennas are arranged in a manner deviating from the arrangement in FIG. 2 and schematically illustrated as seen from above. It will be clear that target data processing unit 5 can have the same embodiment as described for FIG. 2. The radar information originating from the four antennas can however also be correlated in another way to obtain unequivocal target observations. For instance, the plot messages from antennas 2 and 4 may be correlated, as well as the plot messages from antennas 7 and 9. Subsequently, the combined plot messages from antennas 2 and 4 and antennas 7 and 9 respectively, may be correlated with each other to establish whether the individual plots originate from the same target.

Finally, it will be clear that it is possible to replace the second primary antenna of FIG. 2 by a third secondary antenna, while making use of target data processing unit 5 as described for FIG. 2.

I claim:

1. A search radar system including at least first and second radar devices coupled to respective first and second radar antennas, target data processing means for processing target data produced by said radar devices, and radar display means, characterized in that:
   a. the antennas are arranged for rotation together but with mutually different orientations in azimuth;
   b. each of the antennas is arranged to perform a two-dimensional scan with the same elevation angle,
   c. the radar devices individually produce target data representative of successive detections by the respective antennas of indentical targets;
   d. the target data processing means is adapted to correlate the target data for identical targets which is produced by the radar devices and comprises means for predicting from the target data of the first radar device the position of each target for a subsequent revolution of the first antenna as well as the position of each target at the moment when the at least one second antenna will detect said target, and to predict, from the target data of the at least one second radar device, the position of each target for subsequent revolutions of the at least one second antenna, said predictions being correlated with said detections to establish which target data obtained from the different radar devices originate from identical targets, and
   e. the radar display means receives and displays the target data from the first and second radar devices so as to effectively double the rate at which target data is displayed for a given antenna rotation speed.

2. A search radar system as in claim 1, where the target data processing means is adapted to correct the target data produced by the radar devices for the different orientations in azimuth of the respective antennas coupled to said radar devices, and
   the display means displays the corrected target data.

3. A search radar system as claimed in claim 1 or 2, where the first and second radar antennas are oriented in mutually opposite directions and are mounted so that each antenna covers the same elevation area.

4. A search radar system as in claim 1 or 2 comprising two primary radar devices coupled to respective primary radar antennas oriented in mutually opposite directions and two secondary radar devices coupled to respective secondary radar antennas oriented in mutually opposite directions, the directions in which said primary antennas are oriented being orthogonal to the directions in which said secondary antennas are oriented.

5. A search radar system as in claim 1 or 2 comprising one primary radar device coupled to a respective primary radar antenna and three secondary radar devices coupled to respective secondary radar antennas, said antennas being oriented in four respective azimuths which are angularly separated by ninety degrees.

6. A search radar system comprising; at least a primary and a secondary radar device coupled to a respective primary and a secondary radar antenna, target data processing means coupled to said radar devices for processing target data produced by said radar devices, and radar display means responsive to the target data processing means, characterized in that:
   a. the antennas are arranged for rotation together but with mutually opposite orientations in azimuth;
   b. the antennas are arranged so that each performs a conventional two-dimensional scan with substantially the same elevation angle;
   c. the radar devices individually produce data representative of successive detection by the respective antennas of identical targets;
   d. the target data processing means is adapted to correct the target data produced by the radar devices for the different orientations in azimuth of the respective antennas coupled to said radar devices; and
   e. the radar display means individually display the individually produced corrected data so as to effectively double the display update rate.

7. A search radar system as claimed in claim 6, further comprising a target track data processor for processing the individually produced corrected data to target tracks, and wherein the target track data processor is adapted to correlate the corrected data for identical targets produced by the radar devices and comprises means for predicting from the target data of one of the radar devices the position of each target for a subsequent revolution of the corresponding antenna as well as the position of each target at the moment when the other antenna will detect said target, and to predict, from the target data of the other radar device, the position of each target for subsequent revolutions of the corresponding antenna, such as to effectively double the track process update rate.

8. A search radar system as claimed in claim 6 wherein the secondary radar device supplies target data to the target data processing means which is independent of the target data supplied to the target data processing means by the primary radar device.

* * * * *